United States Patent
Backes et al.

(10) Patent No.: US 9,342,197 B2
(45) Date of Patent: May 17, 2016

(54) METHOD FOR DETERMINING A POSITION OF A CONTACT ON A CAPACITIVE SENSOR FIELD

(75) Inventors: Ulrich Backes, Radolfzell (DE); Wulf Reise, Constance (DE)

(73) Assignee: TRW Automotive Electronics & Components GmbH (DE)

( * ) Notice: Subject to any disclaimer, the term of this patent is extended or adjusted under 35 U.S.C. 154(b) by 0 days.

(21) Appl. No.: 13/989,872

(22) PCT Filed: Dec. 8, 2011

(86) PCT No.: PCT/EP2011/072160
§ 371 (c)(1),
(2), (4) Date: Aug. 21, 2013

(87) PCT Pub. No.: WO2012/076637
PCT Pub. Date: Jun. 14, 2012

(65) Prior Publication Data
US 2014/0002418 A1 Jan. 2, 2014

(30) Foreign Application Priority Data

Dec. 8, 2010 (DE) .......................... 10 2010 053 684

(51) Int. Cl.
*G06F 3/044* (2006.01)
*G06F 3/0354* (2013.01)
*G06F 3/041* (2006.01)

(52) U.S. Cl.
CPC .............. *G06F 3/044* (2013.01); *G06F 3/0354* (2013.01); *G06F 3/0418* (2013.01)

(58) Field of Classification Search
CPC .......... G06F 3/041–3/047; G06F 2203/04101; G06F 2203/04113
USPC .......... 345/173–178; 178/18.01–18.09, 18.11
See application file for complete search history.

(56) References Cited

U.S. PATENT DOCUMENTS 5,463,388 A * 10/1995 Boie et al. ...................... 341/33
5,479,528 A 12/1995 Speeter
(Continued)

FOREIGN PATENT DOCUMENTS

| EP | 0 483 709 | 10/1991 |
| EP | 0 609 021 | 1/1994 |
| EP | 1 741 476 | 1/2007 |

*Primary Examiner* — Stephen Sherman
(74) *Attorney, Agent, or Firm* — Tarolli, Sundheim, Covell & Tummino LLP

(57) ABSTRACT

In a method of determining a position of a touch on a capacitive sensor field having a grid of a plurality of discrete electrodes (12), contacted electrodes are determined by measuring a capacitance value for each of the electrodes and by checking for each of the electrodes for the measured capacitance value whether this value is above a predefined threshold value. A rough touch position ($B_g$) is calculated by weighting the electrode position with the measured capacitance value. A touch diameter (14) is calculated from the measured capacitance values, and a final touch position ($B_e$) is calculated from the rough touch position ($B_g$) and the calculated touch diameter (14) using a value table in which correction values that were determined empirically or by means of simulation are stored for possible rough touch positions ($B_g$) and given touch diameters (14).

11 Claims, 3 Drawing Sheets

(56) References Cited

U.S. PATENT DOCUMENTS

| | | |
|---|---|---|
| 6,288,707 B1 | 9/2001 | Philipp |
| 7,800,593 B2 * | 9/2010 | Ohta .......................... 345/173 |
| 2002/0067348 A1 * | 6/2002 | Masters et al. ............... 345/175 |

\* cited by examiner

METHOD FOR DETERMINING A POSITION OF A CONTACT ON A CAPACITIVE SENSOR FIELD

RELATED APPLICATIONS

This application corresponds to PCT/EP2011/072160, filed Dec. 8, 2011, which claims the benefit of German Application No. 10 2010 053 684.9, filed Dec. 8, 2010, the subject matter of which are incorporated herein by reference in their entirety.

BACKGROUND OF THE INVENTION

The present invention relates to a method of determining a position of a touch on a capacitive sensor field having a grid of a plurality of discrete electrodes.

In two-dimensional touchpads the accuracy of recognition is, as a rule, improved in that the electrode grid is designed to be very tight. In particular, the distance between the electrodes is selected to be distinctly smaller than an average touch diameter of a fingertip. This, however, results in a large number of electrodes, which involves a high complexity in signal evaluation.

SUMMARY OF THE INVENTION

The object of the invention is to present a method which allows a touch point to be determined with high accuracy even with an electrode grid in which the electrodes are arranged farther apart than is conventionally the case.

This is achieved in accordance with the invention in that (a) touched electrodes are determined by measuring a capacitance value for each of the electrodes and checking for each of the electrodes for the measured capacitance value whether this value is above a predefined threshold value;

(b) a rough touch position is calculated by weighting the electrode position with the measured capacitance value;

(c) a touch diameter is calculated from the measured capacitance values; and (d) a final touch position is calculated from the rough touch position and the calculated touch diameter using a value table in which correction values that were determined empirically or by means of simulation are stored for possible rough touch positions and given touch diameters.

In this way, the touch position can be ascertained with a deviation of less than 1 mm, even for a relatively rough electrode grid.

The correction values are preferably stored for discrete relative positions with a higher resolution than the electrode grid. The resolution may amount to 10 to 200 times that of the electrode grid. In particular, a factor of 100 has been found to be advantageous. The resolution in this context means the pitch of a fine grid arising based on the correction values along the specified directions.

Preferably, the electrodes for which the measured capacitance value is above the threshold value are combined into at least one group of neighboring electrodes, in particular of four electrodes, the centers of which constitute the corners of a rectangle, and the rough touch position is determined for each group of electrodes by a division of the sum of the products of the electrode positions of the group with the measured capacitance values by the sum of all measured capacitance values of the group. The method can be applied in a particularly simple manner if the four electrodes are arranged in a rectangle. A different number of electrodes and different arrangements of electrodes in a group are, of course, also applicable. The method only needs to be adjusted to the geometry.

Symmetries in two directions orthogonal to each other in relation to a center of the group of electrodes may be used for the correction values.

It has been found that it is possible to find a representation for the correction values in which they exhibit a plurality of symmetries, for example in relation to a center of the group of electrodes. These symmetries can be made use of to reduce the number of correction values in that correction values need to be detected and stored only for few predetermined lines. This reduces both the memory requirement and the computing performance to be effected, so that the sensor field can be manufactured more cost-effectively as a whole and shows a lower power consumption.

In a preferred embodiment, a difference value is determined as a correction value with respect to the first direction in that based on the component of the rough touch position in the first direction in relation to the center (M), an x-proportion is defined which originates from a first group of values for a predetermined coordinate along the second direction. Furthermore, a y-proportion of the difference value is defined, based on the component of the rough touch position in the second direction in relation to the center, which originates from a second group of values for a predetermined coordinate along the first direction. The difference value is calculated as a sum of the x-proportion and the y-proportion.

A correction value with respect to the second direction is established analogously. A difference value in the second direction is calculated in that based on the component of the rough touch position in the second direction in relation to the center, a y-proportion is defined which originates from a third group of values for a predetermined coordinate along the first direction, and based on the component of the rough touch position in the second direction in relation to the center, an x-proportion is defined which originates from a fourth group of values for a predetermined coordinate along the second direction. Here, too, the difference value is calculated as a sum of the y-proportion and the x-proportion.

The final touch position is then formed from the sum of the rough touch position and the difference values with respect to the two directions.

In an electrode grid that is structured along two orthogonal directions which will be referred to as x- and y-directions below, and in which a group of electrodes is assumed to be constituted by a group of four electrodes arranged in a rectangle, it is possible, for example, to use half or a quarter of the maximum value of the respective direction for each of the predetermined coordinates. The maximum value is determined in this connection from the distance of the electrodes in the respective direction.

Owing to the symmetries exhibited by the correction values, it is possible here to restrict the value table for the correction values to lines along exactly these predetermined coordinates.

On the basis of the symmetry of the correction values in relation to the center, the groups of values in the first and second directions can each be reduced to half the electrode distance.

The touch diameter may be determined empirically from the measured capacitive values of the electrodes by means of a linear relationship. In this way, a simple and quick estimate of the touch diameter is possible, which corresponds to the diameter of the area in which a fingertip touches the sensor field, i.e. rests thereon.

Preferably, the electrodes are spaced from each other.

The diameter of the electrodes or the distance of the centers of the electrodes preferably amounts to between 5 and 15 mm; the distance may differ in the first and second directions.

The capacitive value of each electrode is preferably measured against ground.

BRIEF DESCRIPTION OF THE DRAWINGS

The invention will be described in more detail below based on an exemplary embodiment and with reference to the accompanying drawings, in which.

DESCRIPTION

Figure 1:
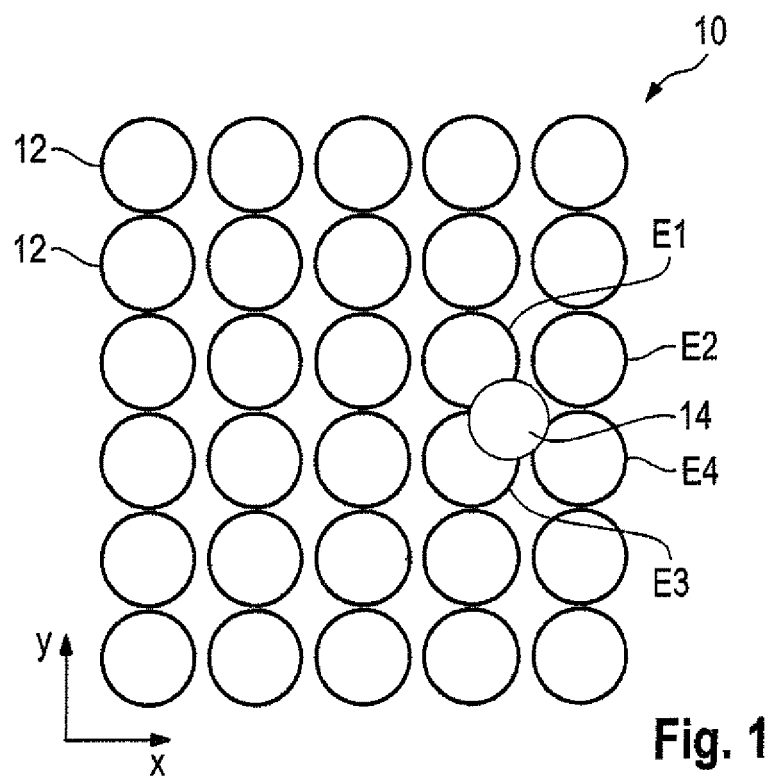
FIG. 1 shows a schematic illustration of a sensor field with a grid of a plurality of discrete electrodes and a touched surface.

FIG. 1 shows a detail of a capacitive sensor field 10 having a grid of a plurality of discrete electrodes 12, only two of which are provided with reference numbers in the Figures. The electrodes 12 are arranged in an orthogonal grid in the x- and y-directions at a distance from each other here. The distance of the electrodes 12 in one direction is the same throughout, but the distance of the electrode centers $x_{max}$ in the x-direction is slightly greater than the distance of the electrode centers $y_{max}$ in the y-direction here.

Figure 5:
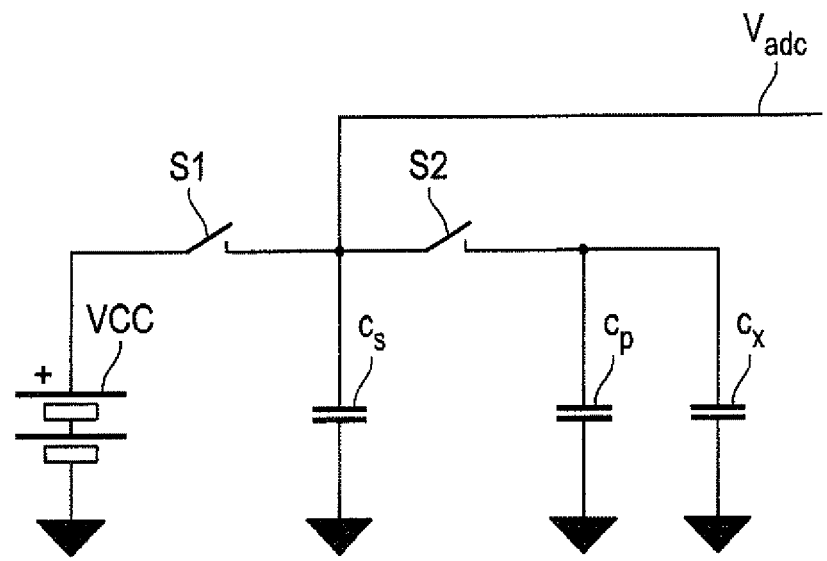
FIGS. 5 and 6 show examples of the method of measuring the capacitance values of the electrodes.
Figure 6:
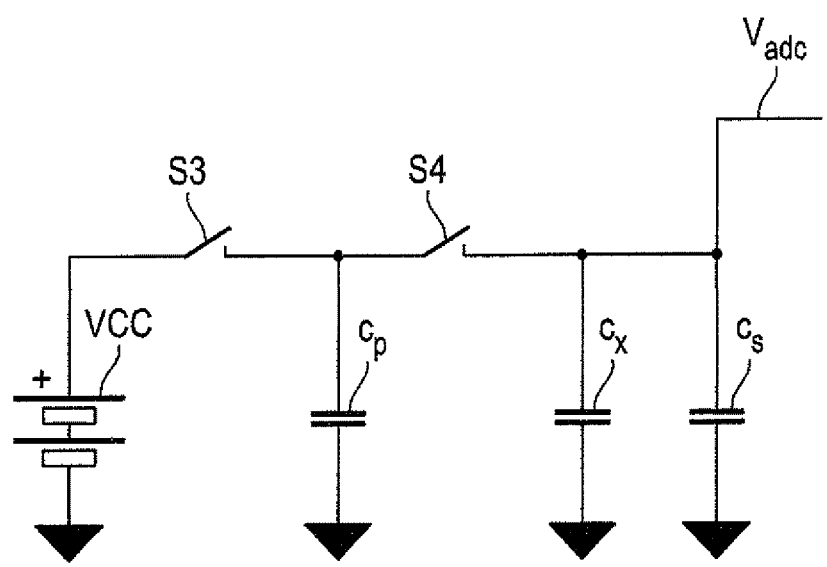

The electrodes 12 can each be connected to ground by means of an evaluation circuit as shown in FIGS. 5 and 6, for example, so that the capacitance of each individual electrode 12 with respect to ground can be ascertained.

The capacitive sensor field 10 is employed as an operating panel for vehicle functions, to operate a radio or a navigation device, for example, and may be arranged in a dashboard of a motor vehicle.

Depending on where a user touches the sensor field 10 with his/her finger or possibly with a dedicated pen, a respective predetermined function is performed. The function can be determined here by a single contact or else by a sequence of contacts, such as, e.g., by drawing a finger to adjust the volume or the like.

In FIG. 1, a touch area 14 is drawn in, having a center formed by the final touch position $B_e$. The touch area 14 is determined here based on the diameter by which the fingertip of the user is in contact with the surface of the sensor field 10. In the present example, the electrodes E1, E3, and E4 are touched to different degrees.

In the example shown here, the electrode distance amounts to 11 mm in the x-direction and to 10 mm in the y-direction. The electrode diameter is selected to be 9.7 mm in this case. A person skilled in the art is, of course, at liberty to vary the diameters, distances, and arrangement of the electrodes. The method of ascertaining the touch position $B_e$ as described below will then have to be modified accordingly.

In a process cycle, at first the capacitive value of each electrode 12 of the grid of the sensor field 10 against ground is determined.

All electrodes 12 having a capacitive value above a predetermined threshold value are rated as touched.

The touched electrodes (in FIG. 1 the three electrodes E1, E3, and E4) are combined with neighboring electrodes (in FIG. 1 the electrode E2) to form a group of four arranged in a rectangle. In the case of FIG. 1, there is only one such group of four because only one touch occurs. However, if the sensor field 10 is touched with two fingers, for example, two groups of electrodes will be determined, for example, and the following method steps would then be carried out for both groups of electrodes separately.

At first, a rough touch position $B_g$ is determined which is then set off against correction values $d_x$, $d_y$ to be determined by means of the rough touch position $B_g$ to ascertain a final touch position $B_e$.

To determine the rough touch position $B_g$, a weighting is performed. To this end, the respective measured capacitance value is multiplied by the position of the electrode 12 in the x- or y-direction, the values thus obtained are added up and divided by the sum of the capacitances.

Then the deviation of the rough touch position $B_g$ to the final touch position $B_e$, which corresponds to the center of mass of the touch area 14, is calculated.

For this purpose, a field of values is defined which includes the associated correction values for predetermined coordinate values of the area between the four electrode centers of the group formed above. The correction values may be ascertained empirically or by a simulation, for example.

For the further procedure, use may be made of the fact that the correction values, viewed over this area, show pronounced symmetries.

Figure 2:
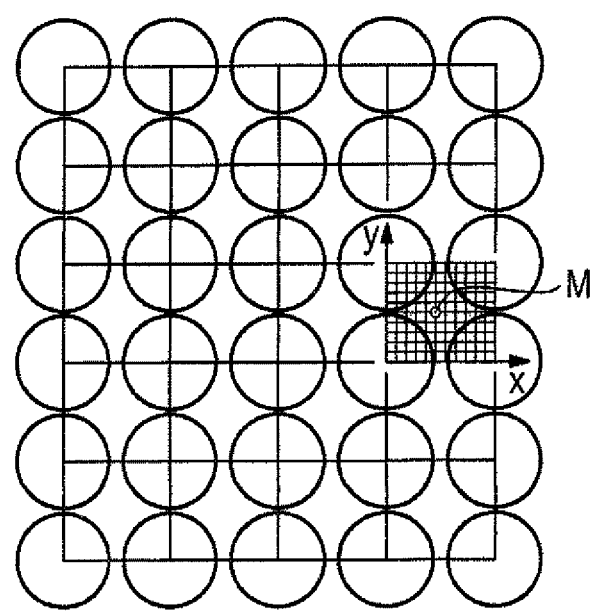
FIG. 2 shows a schematic illustration of the directions and the grid of the value table of the correction values.
Figure 3:
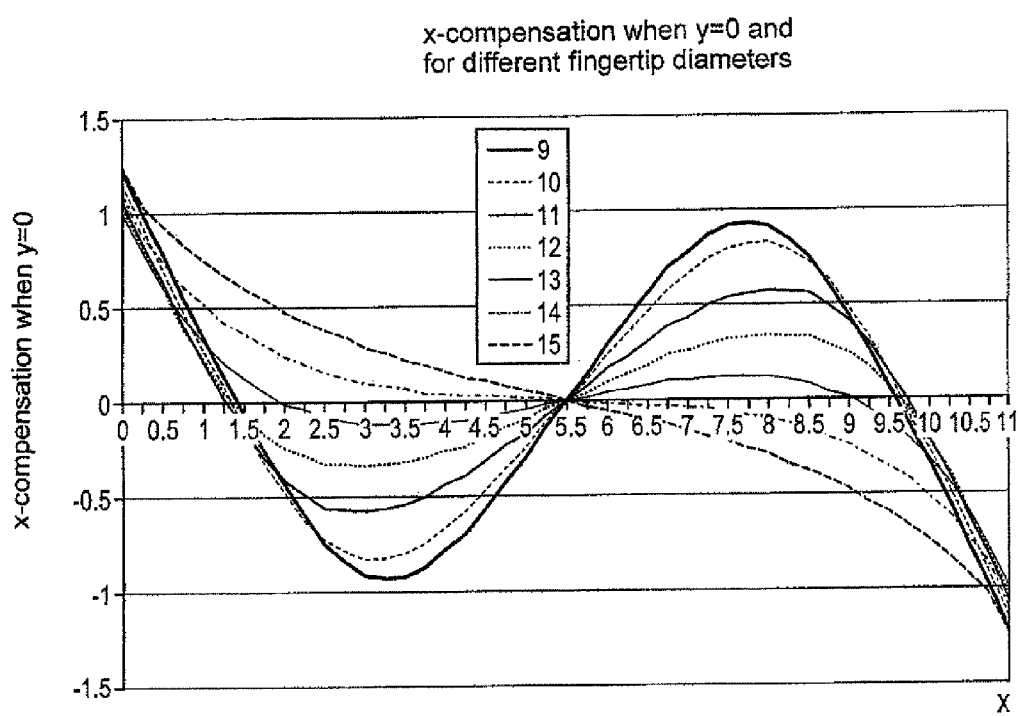
FIG. 3 shows one of the symmetries of the correction values.

The correction values exhibit symmetries with respect to a center M of the group of four electrodes. A section taken through the field of values in the x-direction with y=0 is illustrated in FIG. 3 for different fingertip diameters, that is, different diameters of the touch area 14. The origin of the coordinate system used is located in the center of an electrode, as is illustrated in FIG. 2. This means that each of the four electrodes E1 to E4 covers a different quadrant as well as the free space between the electrodes.

Figure 4:
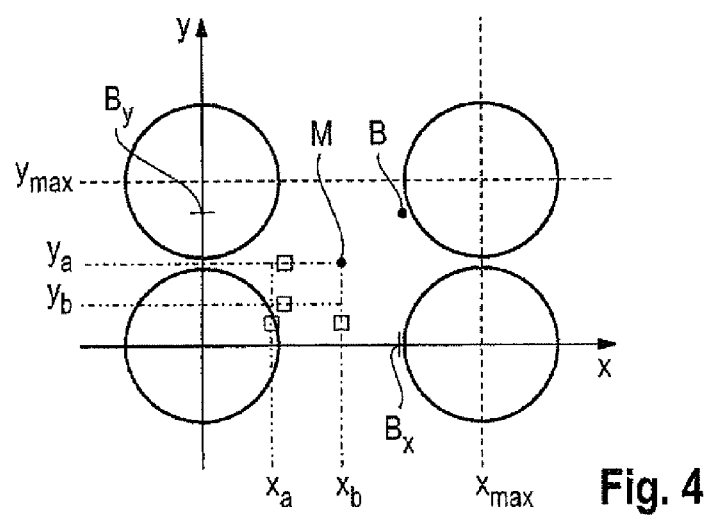
FIG. 4 shows a schematic overview of the coordinate details used.

In the example shown, for example for the x-correction amount there exists antisymmetry in the x-direction and symmetry in the y-direction, respectively, in relation to the center M. It results from this that for the calculation it is already sufficient to store the values of one single quadrant of the range of values shown in FIG. 2, and all further information can be obtained by simple and quick computing operations. This reduces the memory capacity required in the electronic evaluation unit. The memory requirement is further reduced in that the values change only slowly within one quadrant. It has turned out to be sufficient to reduce the range of values to two lines within one quadrant per coordinate direction. This is indicated in FIG. 4.

In the present example, values are detected for this purpose along the x-direction at $y_a = \frac{1}{2} y_{max}$ and serve to determine an x-proportion $d_{x1}$ of a difference value $d_x$ for refining the x-coordinate of the rough touch position $B_g$. In addition, values are detected along the y-direction at an x-coordinate $x_a$ of $\frac{1}{4} x_{max}$, which serve to determine the y-proportion $d_{x2}$ of the difference value $d_x$ for further refinement of the x-coordinate of the touch position.

For ascertaining a difference value $d_y$ for the y-coordinate of the rough touch position $B_g$, values along the y-direction at a value $x_b = \frac{1}{2} x_{max}$ and values along the x-direction at the y-position $y_b = \frac{1}{4} y_{max}$ are used analogously, to determine the proportions $d_{y1}$ and $d_{y2}$.

Thus, four groups of values are established. A first group of values $(x, y_a, k)$ contains the correction values k for a number of x-coordinates at the position $y_a$. A second group of values $(x_a, y, k)$ contains correction values for a number of y-coordinates at the position $x_a$. A third group of values $(x_b, y, k)$ contains the correction values k for a number of y-coordinates at the position $x_b$. A fourth group of values $(x, y_b, k)$ contains the correction values k for a number of x-coordinates at the position $y_b$.

In this way, the field of correction values can be reduced to a simple value table. The distance along the x- and y-directions in which the correction values are detected and stored is, of course, denser here than the distance of the electrodes 12 in the electrode grid. It has been found that a density that is higher by a factor of 100 as compared to the electrode grid is sufficient. This roughly corresponds to a distance of the correction values of 0.1 mm along the electrode grid. When exploiting the symmetries and with a reduction to two lines per coordinate, only about 200 values therefore need to be deposited, stored and read out.

The field of the correction values, however, exhibits a dependency on the diameter of the touch area 14, which corresponds to the diameter of a fingertip.

It has been found that a good approximation for the diameter of the touch area 14 can be obtained from the capacitance values of the touched electrodes 12 by means of a linear relationship. The respective parameters of the linear relationship may be established empirically, by simulation or measurements for a particular sensor field concerned.

The correction values are detected for different diameters of the touch area 14, i.e. fingertip diameters, for example for values of between 9 and 15 mm. For each diameter a separate set of correction values is determined and stored in the memory.

The final touch position $B_e$ is then determined by ascertaining touch positions for the two closest touch diameters 14 stored and interpolating from these values a touch position for the value ascertained by means of the linear relationship.

The basics of the method will be explained below with reference to an example as shown in FIG. 4.

At first, the rough touch position $B_g$ is determined as described above by weighting the capacitance values of the touched electrodes.

Subsequently, difference values $d_x$ and $d_y$ for the x-coordinate $B_x$ and the y-coordinate $B_y$, respectively, of the rough touch position $B_g$ are ascertained for refining the rough touch position $B_g$.

The proportion $d_{x1}$ of the correction value $d_x$ is established by reading out the correction value k corresponding to the value $B_x$ from the correction values along the line $y_a$ (here $\frac{1}{2} y_{max}$) for the coordinate $B_x$. Based on the symmetry relationship in the x-direction, the value read is either used directly or the negative value is used, with the x-coordinate being adjusted appropriately. The following applies here: $d_x(B_x)=k(Y_a(B_x))$ for $B_x<\frac{1}{2} x_{max}$; $d_{x1}(B_x)=-k(Y_a(x_{max}-B_x))$ for $B_x>\frac{1}{2} x_{max}$.

The second correction value $d_{x2}$ is ascertained from the correction values in the y-direction along the coordinate $x_a$ (in this case at $\frac{1}{4} x_{max}$); here, again, the symmetries have to be taken into consideration. If $B_y$, i.e. the y-component of the rough touch position $B_g$, is smaller than $\frac{1}{2} y_{max}$, the correction value stored is used directly; if it is greater than $\frac{1}{2} y_{max}$, the value on the y-coordinate mirrored with respect to the center M is used. The following applies here: $d_{x2}=k(x_a(B_y))$ for $B_y<\frac{1}{2} y_{max}$; $d_{x2}(B_y)=k(y_a(y_{max}-B_y))$ for $B_y>\frac{1}{2} y_{max}$.

The x-difference value $d_x$ is then calculated by a multiplication of $d_{x1}$ and $d_{x2}$. This correction value is added to the x-component $B_x$ of the rough touch position $B_g$, in order to determine the x-component of the final touch position $B_e$.

The y-correction values $d_y$ are ascertained by analogy therewith, the correction value $d_{y1}$ being determined by means of the coordinate $x_b$ (here $\frac{1}{2} x_{max}$) and the correction value $d_{y2}$ being determined by means of the coordinate $y_b$ (here $\frac{1}{4} y_{max}$).

The correction values $d_x$ and $d_y$ are calculated for the two stored touch diameters that are closest to the touch diameter ascertained. In this way, two sets of difference values $d_x$ and $d_y$ each are obtained. The final difference value is determined by an interpolation.

The final difference values $d_x$ and $d_y$ are added to the x- and y-components of the rough touch position $B_g$ to define the final touch position $B_e$.

This allows the error to be reduced to less than 1 mm in each direction.

FIGS. 5 and 6 show possible known methods of measuring the electrode capacitance.

The circuits shown serve to carry out a charge transfer sensing method, in which one capacitor having a known capacitance is charged at a time. $C_S$ is the capacitance of the comparison capacitor here, $c_x$ is the capacitance to be measured, and $c_p$ denote inevitable parasitic capacitances.

In FIG. 5, $c_s$ is first charged with the known reference voltage VCC, which results in a charge of $Q=VCC*c_s$. In the next step, the voltage VCC is disconnected and the capacitor to be measured with the capacitance $c_x$ and, inevitably, the parasitic capacitances $c_p$ is connected to the capacitor $c_s$, so that the charge is distributed accordingly: $Q=VCC*(c_s+c_x+c_p)$. The voltage VC can be calculated from this as $VC=VCC*/(c_s+c_x+c_p)$.

As an alternative, the method shown in FIG. 6 may also be carried out, where, using similar calculations, VC is determined to be $VC=VCC*(c_p+c_x)/(c_s+c_x+c_p)$. These methods are described in US 2010/0181180 A1 in more detail.

The invention claimed is:

1. A method of determining a position of a touch on a capacitive sensor field having a grid of a plurality of discrete electrodes (12), wherein:
   (a) touched electrodes are determined by measuring a capacitance value for each of the electrodes and checking for each of the electrodes for the measured capacitance value whether this value is above a predefined threshold value;
   (b) a rough touch position ($B_g$) is calculated by weighting the electrode position with the measured capacitance value;
   (c) a touch diameter (14) corresponding to a diameter of an area where a fingertip contacts two or more electrodes of the plurality of electrodes on a surface of the sensor field is calculated from each of the measured capacitance values; and
   (d) a final touch position ($B_e$) is calculated from the rough touch position ($B_g$) and the calculated touch diameter (14) using a value table in which correction values (k) that were determined empirically or by means of simulation and are dependent on the rough touch position ($B_g$) and the touch diameter (14) are stored for possible rough touch positions ($B_g$) and given touch diameters (14).

2. The method according to claim 1, characterized in that the correction values (k) are stored for discrete relative positions with a higher resolution than the electrode grid.

3. The method according claim 1, wherein the electrodes (12) for which the measured capacitance value is above the threshold value are combined into at least one group (E1-E4)

of neighboring electrodes, in particular of four electrodes, the centers of which constitute the corners of a rectangle, and the rough touch position ($B_g$) is determined for each group of electrodes by a division of the sum of the products of the electrode positions of the group with the measured capacitance values by the sum of all measured capacitance values of the group.

4. The method according to claim 3, wherein symmetries in two directions (x, y) orthogonal to each other in relation to a center (M) of the group of electrodes (E1-E4) are assumed for the correction values.

5. The method according to claim 4, wherein:
a difference value ($d_x$) in the first direction (x) is determined in that
based on the component ($B_x$) of the rough touch position ($B_g$) in the first direction (x) in relation to the center (M), an x-proportion ($d_{x1}$) is defined which originates from a first group of values (x, $y_a$, k) of the correction values (k) for a predetermined coordinate ($y_a$) along the second direction (y);
based on the component ($B_y$) of the rough touch position (B) in the second direction (y) in relation to the center (M), a y-proportion ($d_{x2}$) is defined which originates from a second group of values ($x_a$, y, k) of the correction values (k) for a predetermined coordinate ($x_a$) along the first direction (x); and
the difference value ($d_x$) is calculated as a sum of the x-proportion ($d_{x1}$) and the y-proportion ($d_{x2}$);
a difference value in the second direction (y) is determined in that
based on the component ($B_y$) of the rough touch position (B) in the second direction (y) in relation to the center (M), a y-proportion ($d_{y1}$) is defined which originates from a third group of values ($x_b$, y, k) for a predetermined coordinate ($x_b$) along the first direction (x); and
based on the component ($B_x$) of the rough touch position (B) in the second direction (x) in relation to the center (M), an x-proportion ($d_{y2}$) is defined which originates from a fourth group of values (x, $y_b$, k) for a predetermined coordinate ($y_b$) along the second direction (y);
the difference value ($d_y$) is calculated as a sum of the y-proportion ($d_{y1}$) and the x-proportion ($d_{y2}$); and
the final touch position ($B_e$) is formed from the sum of the rough touch position (B) and the difference values ($d_x$, $d_y$).

6. The method according to claim 5, wherein on the basis of the symmetry of the correction values (k) in relation to the center (M), the groups of values in the first and second directions (x, y) are each reduced to half the electrode distance.

7. The method according to claim 1, wherein the touch diameter (14) is determined from the measured capacitive values of the electrodes (12) by means of a linear relationship.

8. The method according to claim 1, wherein the electrodes (12) are spaced from each other.

9. The method according to claim 1, wherein a diameter of the electrodes (12) or a distance of the centers (M) of the electrodes (12) amounts to approx. 5-15 mm.

10. The method according to claim 1, wherein the capacitive value of each electrode (12) is measured against ground.

11. The method according to claim 1, wherein a given correction value of the correction values (k) is associated with a given touch diameter.

* * * * *